No. 766,196. Patented August 2, 1904.

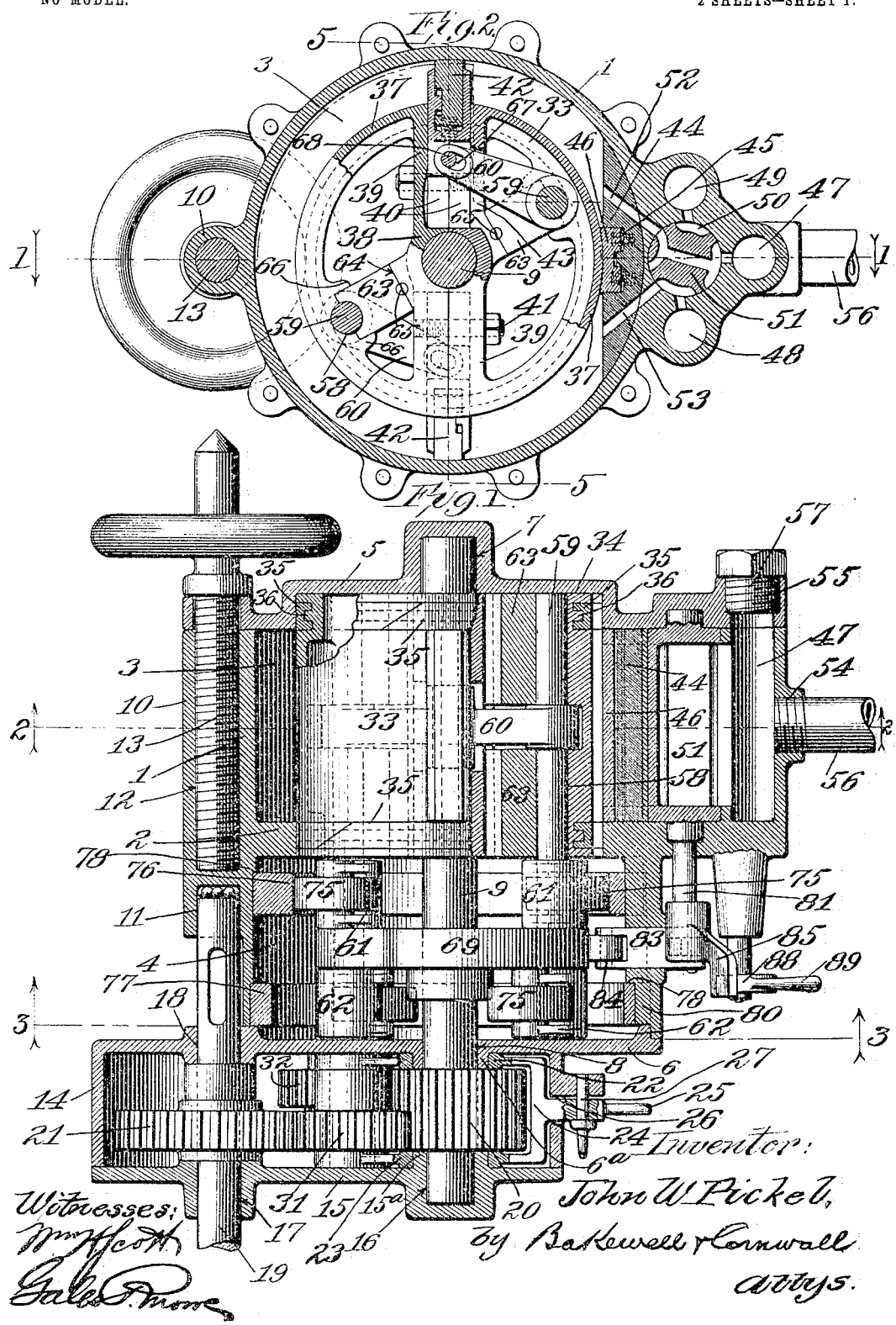

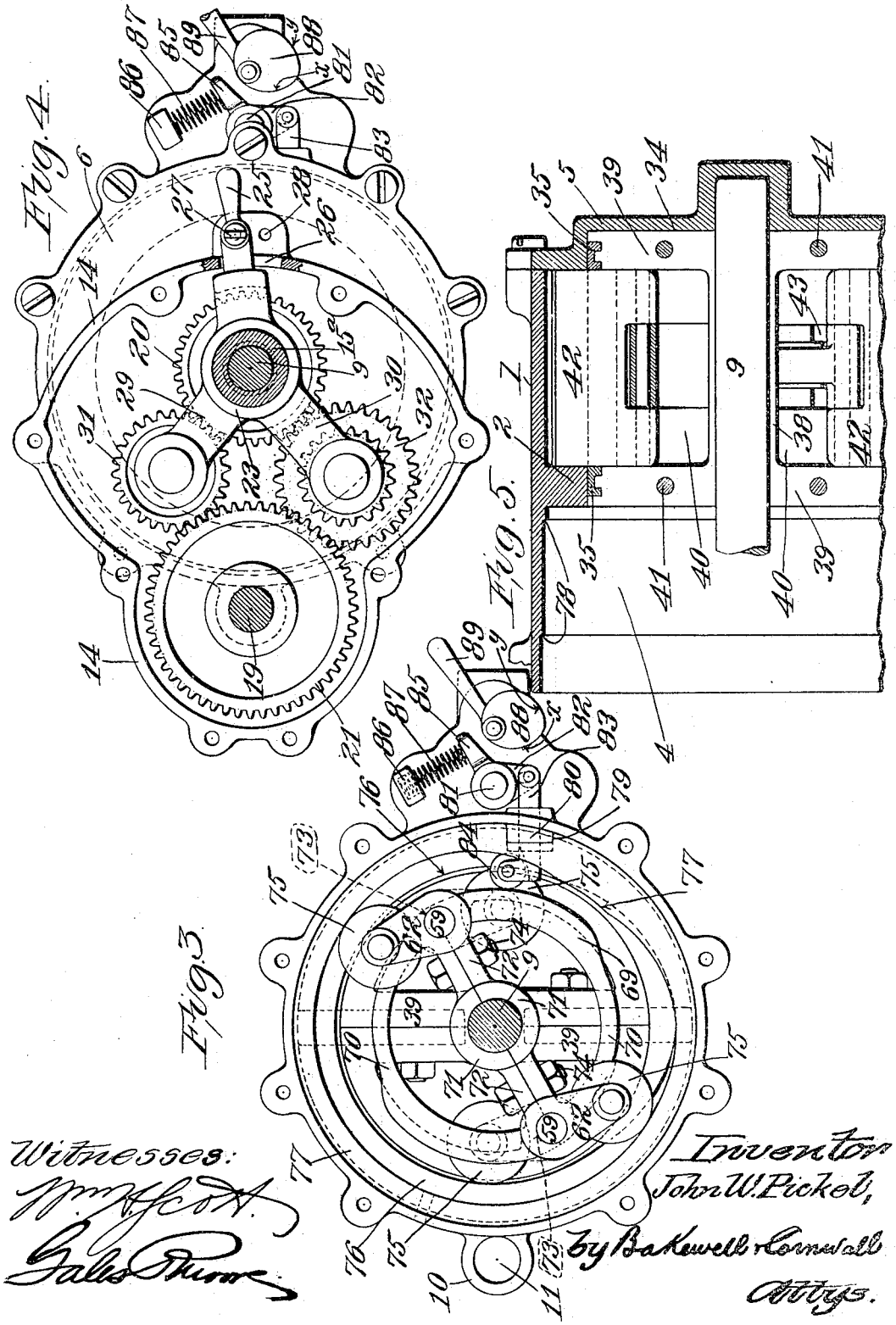

UNITED STATES PATENT OFFICE.

JOHN W. PICKEL, OF CRYSTAL CITY, MISSOURI, ASSIGNOR OF THREE-EIGHTHS TO LOUIS PHILLIPPI AND ROBERT SNYDER, OF CRYSTAL CITY, MISSOURI, AND JESSE F. DONNELL AND PAUL LORENZ, OF FESTUS, MISSOURI.

DRILL.

SPECIFICATION forming part of Letters Patent No. 766,196, dated August 2, 1904.

Application filed January 29, 1902. Serial No. 91,669. (No model.)

*To all whom it may concern:*

Be it known that I, JOHN W. PICKEL, a citizen of the United States, residing at Crystal City, Jefferson county, State of Missouri, have invented a certain new and useful Improvement in Drills, of which the following is a full, clear, and exact description, such as will enable others skilled in the art to which it appertains to make and use the same, reference being had to the accompanying drawings, forming part of this specification, in which—

Figure 1 is a longitudinal elevation, chiefly in section, on the line 1 1 of Fig. 2. Fig. 2 is a transverse sectional bottom plan view on the line 2 2 of Fig. 1. Fig. 3 is a bottom plan view on the line 3 3 of Fig. 1. Fig. 4 is a bottom plan view with the cap removed, and Fig. 5 is a fragmentary elevation on the line 5 5 of Fig. 2.

My invention relates to drills, my object being to provide a compact, strong, and efficient structure.

To these ends and also to improve generally upon devices of the character indicated my invention consists in the various matters hereinafter described and claimed.

Referring now more particularly to the drawings, 1 represents the main casing, which is of general cylindrical form and has intermediate its ends and parallel thereto an interior annular rib 2, which divides the said casing into two chambers 3 and 4, respectively, the chamber 3 forming the cylinder of a rotary engine and the chamber 4 housing certain operating parts to be more fully hereinafter described. Heads 5 and 6 close the ends of said main casing 1 and are provided with bearings 7 and 8 for the main shaft 9 of the motor or rotary engine, said shaft being concentric with the inner circumference of the annular rib 2. The said main casing has a longitudinal enlargement or boss 10 at a suitable point, and this enlargement has a seat 11 in what may be termed its "forward" end—*i. e.*, the end toward the drill—and a long threaded seat 12, opening upon its rear end, said seat 12 receiving the feed-screw 13. The head 6 extends beyond the said main casing, as shown in Figs. 1 and 4, and is provided with an outwardly-extending wall or flange 14 about the gears to be hereinafter described, a cap-plate 15 being suitably secured upon said wall, and the said gears being thus effectively housed. The said cap has a seat 16 upon its inner face for the end of the main shaft and has also a bearing 17, which is in line with the before-mentioned seat 11, and a bearing 18 in the head 6, the drill or tool spindle 19, having its drill socket or clamp formed in any appropriate manner, extending through said bearings 17 and 18 and having its end received in said seat 11. The end of the drill-spindle bearing against the inner wall of said seat, (or, preferably, against ball-bearings interposed between said wall and said spindle end,) the thrust is against said wall and not against the hereinafter-described drill-spindle gear, said gear being thus relieved of unnecessary strain.

Suitably fastened upon the main shaft 9 is a driving-gear 20, which fits between the bosses of the main shaft-bearings in the head 6 and the cap, respectively, and fast upon the drill-spindle 19 is a gear 21. The said bosses 6ª and 15ª have their outer faces trued to produce, in effect, a stud upon which is mounted a yoke-frame, whose plates 22 and 23 lie upon opposite sides of the driving-gear 20 and fit between said gear and the said head and cap, respectively, each of said plates being provided with an opening, into which the said respective bosses are received. The connecting-plate 24 of the yoke is provided with a handle 25, which projects through a slot 26 in the wall 14, and by means of this handle the operator can rock this yoke upon its fulcrum, a pin 27, extending through the handle and engaging an opening 28 in a suitable frame-plate, serving to lock the yoke-frame in its adjusted position. Each yoke-frame plate 22 and 23 is preferably provided with diverging arms 29 and 30, and pinions 31 and 32 are journaled between the respective sets of said arms, both of said pinions being constantly in mesh with the driving-gear and said pinions being so supported upon the yoke-frame that either of them (but not both simultaneously) can be thrown into engagement with the gear upon the drill-spindle. These pinions being so constructed that they respectively transmit different numbers of revolutions to the drill-spindle gear, it will be readily apparent that the speed of the drill can be varied by merely appropriately shifting the yoke-frame.

The motor herein illustrated is a rotary engine designed to be run by any appropriate motive fluid, such as compressed air. The piston 33 of said engine is seated at one end against the inner circumference of the beforementioned annular rib 2 and is of such length that it extends beyond the end of the main casing 1 and is received in a recess 34 in the inner face of the head 5, suitable expansible packing-rings 35 being interposed between the piston ends and the said rib and annular wall of the said recess. These rings are grooved, as shown, upon their inner faces, whereby they are substantially U-shaped in cross-section and are received in appropriate grooves in the piston, suitable tongues 36, formed upon the piston, extending into the packing-ring grooves. Thus a most tortuous passage is presented to any air which may tend to escape. Furthermore, these rings fit the pistons and inclosing walls sufficiently tightly to effectively prevent the escape of the motive fluid, but at the same time are not rigidly fastened upon the piston, whereby they can either revolve therewith or cling to the cylinder-wall, thus permitting the movement of the piston to take place between the surfaces which may present the least resistance, and thereby reducing friction and facilitating light running of the engine. The piston is of course fast upon the main shaft and revolves therewith. The ends of the main shaft enter the seats 7 and 16 in the head 5 and cap, respectively, and are housed by said seats, leakage of motive fluid through the piston-shaft bearings being thus prevented.

I prefer to construct the piston of two semicylindrical parts, each of which has a circumferential plate 37 and a hub portion 38 adapted to fit about the main shaft, while a web 39 connects the hub to the circumferential plate. Each web has a recess 40 formed in its inner face, and when the piston-sections are assembled about the shaft the webs abut, as illustrated in Fig. 2, bolts 41 being secured through said webs at the sides of said recesses and said recesses combining to produce grooves for the piston-heads 42. One of the webs of each coöperating pair is provided with a slot 43 for a purpose to be more fully hereinafter described.

Preferably the bore of the main casing, which forms the engine-cylinder, is turned out perfectly round, and a segmental block 44 is secured therein at an appropriate point, said block extending the length of the cylinder and having in its face adjacent the piston a recess 45, in which is placed a suitable abutment 46. This structure greatly simplifies the manufacture of the engine, it being only necessary to turn out the cylinder, cut the block 44, and then assemble the parts. At about the position of the said block the main casing is enlarged and provided with chambers 47, 48, and 49, the first of these being an inlet-chamber and the others being outlet-chambers, while a cylindrical valve seat or box 50 for the valve 51 is formed intermediate the two outlet-chambers and between the inlet-chamber and the cylinder. Appropriate ports connect the various chambers with the valve-seat, and ports 52 and 53 lead through the casing and the block 44 from the said valve-seat to opposite sides of the abutment. The valve being provided with the passages usual in a valve applied to chambers and ports arranged in the manner specified, it will be readily apparent that by properly manipulating the valve the engine can be run in either direction as desired, and the ports leading to the cylinder can be throttled. The inlet-chamber 47 has a threaded opening 54 in its side and a similar opening 55 in its end. Thus the pipe 56, leading from the source of motive fluid, can be connected in either of said openings whereby the connection can be made, as may be more convenient, owing to the particular position in which the drill is being worked, and the opening not receiving said pipe can be closed by a screw-plug 57.

Semicircular or open seats 58 are formed in the inner face of the circumferential plates of the piston-sections, and each of said seats extends throughout the length of the piston. Rock-shafts 59 rest in said seats and extend across the piston and project beyond the forward end of the same into the chamber 4, arms 60, 61, and 62 being formed integral with each of said shafts. The arm 60 is at substantially the point of its shaft which lies in the longitudinal center of the piston, and blocks 63, having semicircular seats in their outer faces, lie over the said shafts and extend between the portions of the piston adjacent said shafts and suitable faces 64 upon the hub portions, one of said blocks lying upon each side of an arm 60. Screws 65, inserted from the ends of the piston, engage both a block and its hub-seat, and lugs 66 upon the inner circumference of the piston lie at the sides of each block at its outer end, said blocks being thus firmly held in position and the rock-shafts being securely and conveniently seated. Each arm 60 extends through and is operable in the slot 43 of an appropriate web and has in its free end an elongated slot 67, which receives a pin 68 upon one of the piston-heads. Thus the piston-heads being connected to the rock-shafts, as specified, rocking of said shafts produces reciprocation of said piston-heads in a well-understood manner.

Fast upon the main shaft and in substantially the longitudinal center of the chamber 4 is an operating-cam 69, said cam being preferably constructed as illustrated in Fig. 3— that is to say, said cam is composed of semicircular sections, each of which has a circumferential portion 70, a hub portion 71, provided with a seat for half of the main shaft, and web portions 72, connecting the hub portion with the circumferential portion, a semicircular or open seat 73 being formed in the abutting inner face of each cam-section on opposite sides of the hub, whereby when the cam-sections are fitted about the main shaft their inner edges are in substantial abutment, and bolts 74, passing through the webs, serve to firmly clamp the said sections upon the said shaft. The semicircular seats 73 of each pair coöperate to produce a bearing for one of the rock-shafts 59, and the rock-arms 61 and 62, which extend oppositely from the rock-shaft which carries them, lie upon opposite sides of the cam 69.

Each of said rock-arms carries at its outer or free end a roller 75, the rollers upon the arms 61 traveling upon a cam-track 76 and the rollers upon the arms 62 traveling upon a cam-track 77. The inner faces of these tracks upon which the rollers travel are circumferentially displaced with respect to each other, whereby as the operating-cam and the piston revolve, and thus carry the rock-shafts and their roller-carrying arms in a circle, the rollers follow the said cam-faces and the shafts 59 are rocked in a well-understood manner, this movement of the shafts serving to reciprocate the piston-heads in order to cause them to properly move with respect to the abutment and the block in which said abutment is seated.

The cam-rings 76 and 77 extend around the rock-shafts and their rock-arms and outside of the same, their peripheries being preferably circular, whereby they can be readily slipped into and out of the chamber 4 from the end thereof, and the main casing is provided with interior shoulders 78, against which the respective rings bear when they are forced home. The inner end of the outer shoulder— i. e., the end toward the center of the chamber—being in longitudinal line with or outside of the outer end of the inner shoulder and the rings being of correspondingly different diameters, the manner of inserting and removing the said rings will be apparent. Preferably each ring is provided with a recess 79 in its periphery, and corresponding lugs (or a single lug of different heights) 80 are formed upon the main casing and enter said respective recesses when the rings are in place, said lugs and recesses serving to hold the rings against circumferential displacement and also serving as guides in setting the rings. Manifestly the cam-tracks could be made integral with the main casing; but I prefer to employ the rings as just described.

The stem 81 of the valve 51 projects beyond the casing forming the valve seat or box and has at its outer end a rock-arm 82, which is pivotally connected to a bar 83, slidably seated in the wall of the chamber 4 and extending through said wall, said bar having upon its inner end a roller 84, which engages and travels upon the periphery of the operating-cam. A finger 85 also extends from the valve-stem, and between said finger and a suitable lug 86 on the casing is an expansion-spring 87, which under normal operating conditions serves to act upon said finger to hold the said roller against the said operating-cam. Manifestly, the cam having the shape illustrated in Fig. 3, as said cam revolves with the piston it operates upon the roller 84 and with the spring 87 to cause the valve 51 to properly cut off.

Pivotally mounted upon the casing and upon the side of said finger 85 opposite the said spring 87 is a cam-plate 88, which lies in the plane in which said finger moves and is preferably provided with an operating-handle 89. As illustrated in the accompanying drawings, the valve is so thrown that the portion of the engine-cylinder to the right of the abutment is in communication with the inlet-chamber and the portion of said cylinder to the left of the said abutment is in communication with the exhaust. To produce this position of the valve, the roller 84 rests upon the higher or wider portion of the operating-cam, the spring 87 being thus placed under tension, and when the said valve is in the position described the finger 85 is removed from the stop-cam 88. As the piston continues its revolution the roller 84 rides downwardly upon the narrower or lower cam portion, being forced thereupon by the spring 87, and the valve is rocked to the right (as the parts are shown in the accompanying drawings) sufficiently to cause the motive fluid to be cut off from the port which connects the valve-seat to the engine-cylinder, further rotation of the operating-cam causing the valve to be rocked back into the position shown in Fig. 2. Should it be desired to throttle the engine, the cam-plate 88 is turned upon its pivot to bring a point or portion $x$ in engagement with the said finger, this point $x$ of the cam-plate being so removed from the pivot that the cam-plate acts through the finger 85 to rock the valve to the left until its solid portions cover both ports leading from the valve-seat to the cylinder, the roller 84 being carried out of contact with the operating-cam when the valve is in this throttling position. To reverse the engine, the said cam-plate is further turned to bring a point or portion *y* thereof in contact with the said finger 85, said point *y* being so removed from the pivotal point of the cam-plate that the valve is rocked to the left sufficiently to bring its ports into such relation with the casing-ports that the said casing-port which leads to the left side of the abutment is in communication with the inlet-chamber and the casing-port which leads to the right side of the abutment is in communication with the exhaust, all as will be readily apparent from an inspection of Fig. 2. Of course when the valve is thus reversed the roller 84 is held out of contact with the operating-cam, and there is no cut-off during the action of the engine. Furthermore, should the engine come to rest with the roller 84 upon one of the lower portions of the operating-cam and the inlet-port to the cylinder thus be closed, in order to open said port for starting the engine it is only necessary to move the cam-plate sufficiently to rock the valve into port-opening position, the said cam-plate being thrown back into normal position (shown in Fig. 3) as soon as the engine has gotten under headway. Thus the single valve operates to automatically cut off the fluid-pressure during the working of the engine, to throttle the engine, and to reverse the same.

It is believed that the general operation of the present device will be clear without a further detailed description of the same. Pressure fluid being admitted to the cylinder, as illustrated in Fig. 2, the piston is rotated in a well-understood manner and carries with it the rock-shafts and the piston-heads, as well as the main shaft and the operating-cam. The rollers upon the rock-arms 61 and 62 so follow their cam-tracks that the piston-heads are properly reciprocated, and the operating-cam acts to properly rock the valve. The main shaft transmits motion to the drill-spindle; and by reason of the mechanisms heretofore described the speed of this spindle can be varied, and its rotation can be stopped or reversed. The entire structure is light and strong, and the parts are compactly and conveniently arranged, so that a very practical and efficient apparatus results.

I am aware that many minor changes in the construction, combination, and arrangement of the several parts of my device can be made and substituted for those herein shown and described without in the least departing from the nature and principle of my invention.

Having thus described my invention, what I claim as new, and desire to secure by Letters Patent, is—

1. In a drill or the like, a supporting member having a boss provided with a shaft-bearing, a shaft in said bearing, a gear upon said shaft, a suitably-supported tool-spindle, a gear thereon, a swinging frame journaled upon said boss, and a gear mounted upon said frame and adapted to connect said before-mentioned gears; substantially as described.

2. In a drill or the like, supporting members provided with bosses which extend toward each other and are provided with bearings, a shaft journaled in said bearings, a gear upon said shaft and between said bosses, a tool-driving shaft in operative connection with said gear, and a yoke-frame journaled upon said bosses, the respective plates of said frame lying between said gear and said respective supporting members; substantially as described.

3. In a drill or the like, a chambered casing provided with a seat outside of the chamber, a head upon said casing and having a portion extending beyond the same and provided with a bearing, a wall upon said head and extending therefrom, a cap upon said wall and provided with a bearing, a motor in said casing and including a shaft having a bearing in and extending through said head, a tool-spindle extending through and seated in said bearings in said cap and said head and having its end seated in said seat, and gearing between said shaft and said spindle and located in the chamber formed by said head, wall and cap; substantially as described.

In testimony whereof I hereunto affix my signature, in the presence of two witnesses, this 23d day of January, 1902.

JOHN W. PICKEL.

Witnesses:
  GEORGE BAKEWELL,
  G. W. PENNINGTON.